United States Patent Office 2,951,059
Patented Aug. 30, 1960

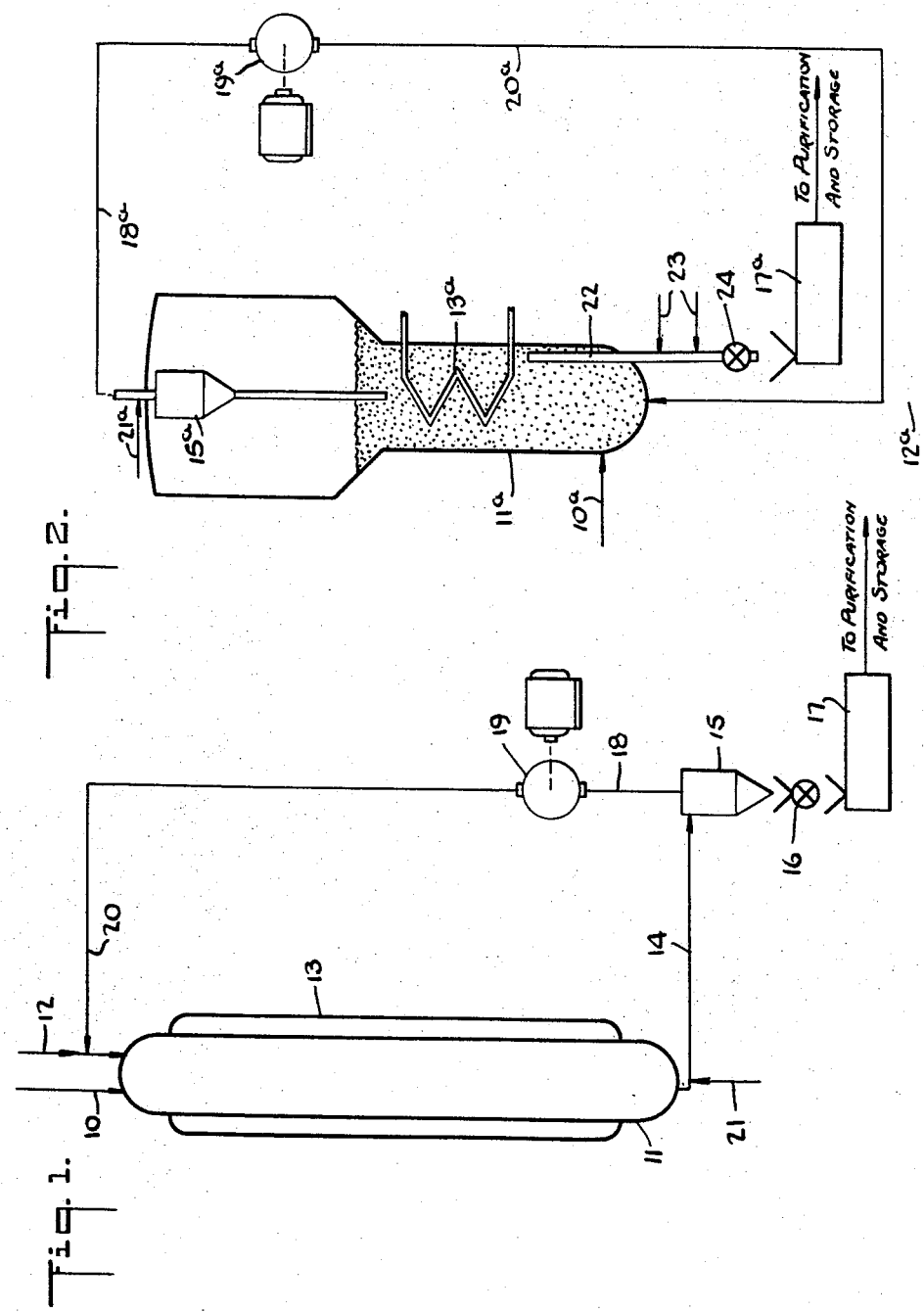

2,951,059

VAPOR PHASE POLYMERIZATION OF TRIOXANE

Oliver H. Axtell, Jr., Scotch Plains, and Charles M. Clarke, Springfield, N.J., assignors to Celanese Corporation of America, New York, N.Y., a corporation of Delaware Filed Mar. 24, 1958, Ser. No. 723,549

16 Claims. (Cl. 260—67)

This invention relates to the production of polyoxymethylene and more particularly to a continuous method for rapidly producing high molecular weight polyoxymethylene from trioxane.

It is known that trioxane polymerizes in the presence of certain catalytic materials to produce tough, high molecular weight polymers and that the polymerization process, with some catalysts, is almost instantaneous. For example, boron fluoride acts almost instantaneously on molten trioxane to produce a tough polymer in almost full yield, as disclosed in application Serial No. 691,144, filed by Donald E. Hudgin and Frank M. Berardinelli on October 21, 1957.

In order to handle the reactant and reaction product expeditiously, it has been proposed to polymerize trioxane in non-aqueous solvents and to recover the polymer as a precipitate. Such procedures slow up the polymerization rate and present the problem of recovering the polymer product from the solvent which wets it.

It is an object of this invention to provide a novel polymerization process wherein the polymerization reaction is carried out rapidly and continuously, wherein no solvent handling is required, and preferably wherein the product is recovered in an easily purifiable state. Other objects will appear hereinafter.

These and other objects are accomplished by a process which comprises continuously introducing vapor phase trioxane into a confined reaction zone having a cooled surface, continuously introducing a vapor phase polymerization catalyst into said reaction zone to promote the formation of solid polyoxymethylene particles therein and continuously withdrawing said solid polyoxymethylene particles from said reaction zone.

In order to facilitate the understanding of the invention, reference is made to the accompanying drawings, of which, Figure 1 represents an embodiment in which the polymer particles are withdrawn from the base of the reaction zone in a gaseous suspension and Figure 2 represents an embodiment in which the polymer particles are withdrawn from the bottom of the reaction zone as a dense, fluidized gaseous suspension.

In a specific embodiment described with reference to Figure 1, trioxane vapor at a temperature of 120° C. is introduced through line 10 into reactor 11 at the rate of 31 reactor volumes per minute. A stream of boron fluoride catalyst diluted with 14,000 volumes of nitrogen per volume of $BF_3$ is fed into reactor 11 through line 12 at the $BF_3$ rate of 0.08 volume percent of the rate of trioxane feed. The reactor wall is maintained at an average temperature of 25° C. by the circulation of sufficient water coolant through jacket 13.

Polyoxymethylene having an intrinsic viscosity of 3.69 (measured after washing with water in 0.5% solution at 60° C. in p-chlorophenol containing 2% alpha pinene) is formed on the cooled wall, along with unreacted trioxane. They are continuously, or intermittently removed by a scraping blade, not shown, and blown downward by the velocity of the gas flow to pass out of the reaction through line 14.

The gaseous suspension of solid particles is passed to cyclone separator 15, from which the solid polymer particles, along with unreacted trioxane, are withdrawn through star feeder 16 and fed through screw conveyor 17 to purification and storage, while the unreacted trioxane vapor and nitrogen are recycled to catalyst feed line 12 through line 18, compressor 19 and line 20.

In order to avoid continued polymerization downstream of reactor 11 with possible plugging of the lines, separator and compressor, it is preferred to introduce a catalyst neutralizing agent, such as n-tributylamine into line 14 through line 21 just outside of reactor 11. The neutralizing agent is a material which reacts with the catalyst to convert it to a non-catalytic material and is introduced in slight stoichiometric excess over the catalyst. The slight excess of neutralizing agent is carried in the recycle stream and requires a slight excess of catalyst to be introduced through line 12.

The solid polymer particles recovered from the process are dry and contain only trioxane and a small amount of catalyst neutralization product as impurities. The particles are easily purified by washing with water.

It is usually advantageous to pass the trioxane vapor through the reactor in admixture with a diluent gas, such as nitrogen. In cases where reactor conditions are maintained to give a very high conversion, it is necessary to use a diluent gas so that the polymer particles may be carried out in gaseous suspension. Where substantially complete conversion is achieved, recycle lines 18 and 20 and compressor 19 may be omitted and the gaseous effluent from cyclone separator 15 may be vented.

If desired, a diluent gas may be introduced in admixture with the trioxane through line 10 in addition to, or instead of, introducing it with the catalyst. A trioxane-nitrogen mixture, for example, may be prepared by passing nitrogen over, or bubbling nitrogen through, a body of molten trioxane. The total amount of diluent gas used may vary from 0 to 50 volumes of diluent gas per volume of monomer feed and preferably from 1 to 20 volumes. The temperature of the diluent gas may be controlled to minimize or obviate the necessity for cooling coil 13.

The temperature at the reactor wall is preferably in the range −20° C. to +50° C.

In place of a cooled wall, other cooled solid surfaces may be used. Cooling coils in the interior of the reaction zone may be used, for example. The presence of a cooled surface in the reaction zone is essential for the polymerization reaction. In the absence of a cooled surface, the reaction mixture passes through the reaction zone without the formation of a desirable polymer.

Generally, the catalyst selected will be one which has a boiling point below the reactor temperature. However, some catalysts with boiling points above the reactor temperature may be used, provided that they are sufficiently volatile at reaction temperature to maintain the desired catalyst concentration in the reactor in the vapor phase. Vaporization of higher boiling catalysts, such as higher boiling boron fluoride coordinate complexes, may be advantageously achieved by contact with a hot inert gas diluent. The preferred catalysts with trioxane are boron fluoride and boron fluoride coordinate complexes with ethyl ether or butyl ether.

The amount of catalyst introduced through line 12 may vary from about 0.001 to about 3.0 weight percent of the amount of trioxane. Preferably amounts between about 0.01 and about 0.20 weight percent are used.

The total gas feed rate may vary from about 10 to about 1000 reactor volumes per minute. Preferably, total gas feed rates between about 100 and about 500 reactor volumes per minute are used.

In the embodiment of Figure 2, the gas velocity in the reactor is maintained at a controlled rate so that the polymer particles, as they are produced, remain suspended in a dense, fluidized phase resembling a boiling liquid.

The monomer, containing an inert gaseous diluent if desired, is fed through line 10a to reactor 11a at a rate controlled to give an average linear gas velocity in the reactor of about 0.2 feet per second. Under these conditions the solid particles are suspended in a dense fluidized phase, having a turbulent upper level, and having a dilute particle-containing phase thereabove. The expanded cross sectional area of the upper portion of the reaction vessel reduces the gas velocity therein and assists in the disengagement of the solid particles from suspension. The dense fluidized phase behaves as a liquid and exerts fluistatic pressure. Cooling coils 13a cool the dense fluidized mixture to below the solidification temperature of trioxane by the circulation of a cooling liquid.

Catalyst vapor is fed to the reactor through line 12a. The effluent gases pass through cyclone separator 15a, which is located within the reactor shell and then pass out through line 18a. Catalyst neutralizing agent is introduced through line 21a and the effluent is recycled through compressor 19a and line 20a to catalyst feed line 12a.

Polymer particles in the dense fluidized phase are passed downwardly through stand pipe 22 by fluistatic pressure. Small amounts of nitrogen are introduced into standpipe 22 through lines 23 to fluidize and strip the particles in the standpipe. The particles are passed through star feeder 24 to screw conveyor 17a and thence to storage.

The polyoxymethylene produced by the process of this invention are of exceptionally high molecular weights and comparable to the best of those produced with similar catalysts in other systems. They are thermally stable and useful in the form of molded and extruded objects.

It is to be understood that the foregoing detailed description is merely given by way of illustration and that many variations may be made therein without departing from the spirit of our invention.

Having described our invention, what we desire to secure by Letters Patent is:

1. A process for preparing a high molecular weight polyoxymethylene which comprises continuously introducing vapor phase trioxane into a confined reaction zone having a surface cooled by passage of a cooling medium, continuously introducing into said reaction zone in vapor phase a catalyst for the polymerization of trioxane to polyoxymethylene to promote the formation of solid polyoxymethylene particles therein, and withdrawing said solid polyoxymethylene particles from said reaction zone.

2. A process for preparing a high molecular weight polyoxymethylene which comprises continuously introducing vapor phase trioxane into a confined reaction zone having a cooled surface maintained at a temperature between about —20° and 50° C., continuously introducing into said reaction zone in vapor phase a catalyst for the polymerization of trioxane to polyoxymethylene to promote the formation of solid polyoxymethylene particles therein, and withdrawing said solid polyoxymethylene particles from said reaction zone.

3. A process for preparing a high molecular weight polyoxymethylene which comprises continuously introducing vapor phase trioxane into the lower portion of a vertically extended reaction zone having a surface cooled by passage of a cooling medium, continuously introducing a vapor phase boron fluoride catalyst into said reaction zone to promote the formation of solid polyoxymethylene particles therein and continuously withdrawing said solid polyoxymethylene particles from said zone in a gaseous suspension.

4. A process for preparing a high molecular weight polyoxymethylene which comprises continuously introducing vapor phase trioxane into the lower portion of a vertically extended reaction zone having a cooled surface maintained at a temperature between about —20° and 50° C., continuously introducing a vapor phase boron fluoride catalyst into said reaction zone to promote the formation of solid polyoxymethylene particles therein and continuously withdrawing said solid polyoxymethylene particles from said zone in a gaseous suspension.

5. A process for preparing a high molecular weight polyoxymethylene which comprises introducing vapor phase trioxane into the upper portion of a vertically extended reaction zone having a surface cooled by passage of a cooling medium, continuously introducing a vapor phase boron fluoride catalyst into said reaction zone to promote the formation of solid polyoxymethylene particles therein and withdrawing said solid polyoxymethylene particles from said zone.

6. A process for preparing a high molecular weight polyoxymethylene which comprises continuously introducing vapor phase trioxane into a confined reaction zone having a cooled surface, continuously introducing a vapor phase boron fluoride catalyst into said reaction zone to promote the formation of solid polyoxymethylene, continuously introducing a gaseous diluent into said reaction zone and continuously withdrawing solid polyoxymethylene from said reaction zone.

7. A process for preparing a high molecular weight polyoxymethylene which comprises continuously introducing vapor phase trioxane into the lower portion of a vertically extended reaction zone containing a solid surface cooled by passage of a cooling medium, continuously introducing a vapor phase boron fluoride catalyst into said reaction zones to promote the formation of solid polyoxymethylene and continuously withdrawing polyoxymethylene particles downwardly from said zone in a gaseous suspension.

8. A process for preparing a high molecular weight polyoxymethylene which comprises continuously introducing vapor phase trioxane into a confined reaction zone containing a cooled solid surface, continuously introducing a vapor phase boron fluoride catalyst into said reaction zone to promote the formation of solid polyoxymethylene particles therein, maintaining the temperature of said solid surface of between about —20° and about 50° C., and continuously withdrawing said solid polyoxymethylene particles from said reaction zone.

9. A process for preparing a high molecular weight polyoxymethylene which comprises continuously introducing vapor phase trioxane into a confined reaction zone containing a cooled solid surface, continuously introducing a boron fluoride catalyst into said reaction zone, in an amount between about 0.001 and 3.0 percent based on the weight of trioxane, to promote the formation of solid polyoxymethylene particles therein, maintaining the temperature of said solid surface between about —20° and about 50° C., and continuously withdrawing said solid polyoxymethylene particles from said reaction zone.

10. The process of claim 3 wherein the reactor contains a dense fluidized solid suspension maintained at a temperature between about —20° and about 50° C.

11. The process of claim 3 wherein an inert diluent gas in an amount between about 1 to about 20 volumes per volume of monomer feed is continuously introduced into the reactor.

12. The process of claim 6 wherein a stoichiometric excess of a catalyst neutralizing agent is added to the gaseous suspension effluent just outside of the reaction zone.

13. A process for preparing a high molecular weight polyoxymethylene which comprises continuously introducing vapor phase trioxane into a confined reaction zone having a surface cooled by passage of a cooling medium, continuously introducing a vapor phase boron fluoride catalyst into said reaction zone to promote the formation of polyoxymethylene particles therein, continuously withdrawing from said reaction zone an effluent comprising unreacted monomer and catalyst and continuously adding a catalyst neutralizing agent to said effluent.

14. The process of claim 1 wherein the polyoxymethylene particles withdrawn from the reaction zone are stripped of impurities by a water wash.

15. The process of claim 9 wherein said catalyst is introduced in weight proportions between about 0.01 and 0.20 percent based on the weight of trioxane.

16. The process of claim 3 wherein said boron fluoride catalyst is a boron fluoride complex.

References Cited in the file of this patent

UNITED STATES PATENTS

| | | |
|---|---|---|
| 2,483,877 | Carney | Oct. 4, 1949 |
| 2,562,796 | Koch | July 31, 1951 |
| 2,768,994 | MacDonald | Oct. 30, 1956 |
| 2,795,571 | Schneider | June 11, 1957 |